(No Model.)
H. BOUSSEMAERE.
PICTURE ALBUM.
No. 391,938. Patented Oct. 30, 1888.
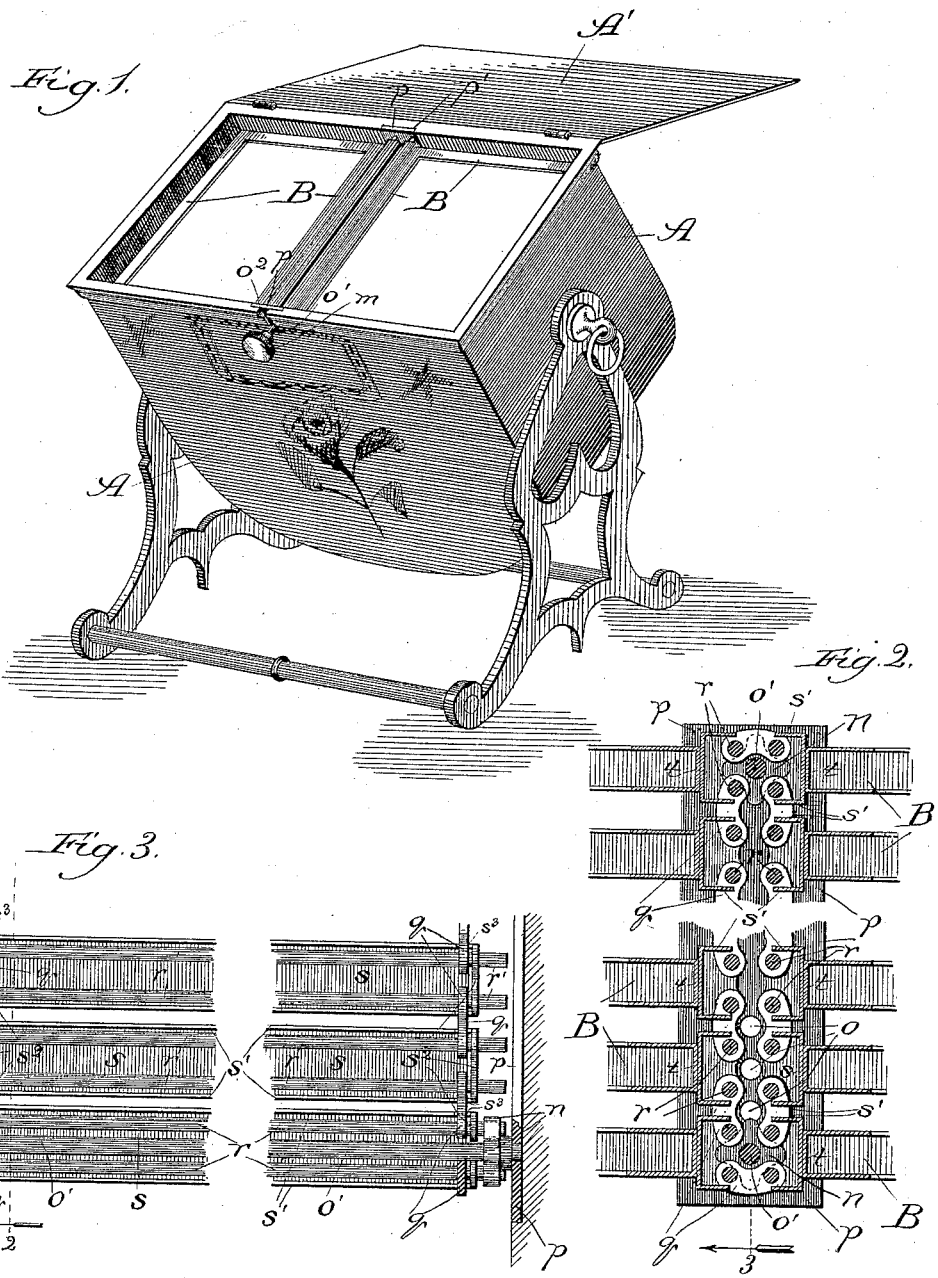
Witnesses:
Chas. E. Gaylord.
J. H. Dyrenforth.
Inventor:
Hyppolite Boussemaere,
By Dyrenforth & Dyrenforth,
Attys.

UNITED STATES PATENT OFFICE.

HYPPOLITE BOUSSEMAERE, OF LAKE VIEW, ILLINOIS.

PICTURE-ALBUM.

SPECIFICATION forming part of Letters Patent No. 391,938, dated October 30, 1888.

Application filed August 2, 1888. Serial No. 281,773. (No model.)

*To all whom it may concern:*

Be it known that I, HYPPOLITE BOUSSEMAERE, a citizen of the United States, residing at Lake View, in the county of Cook and State of Illinois, have invented a new and useful Improvement in Photograph-Albums, of which the following is a specification.

My invention relates particularly to an improvement upon a certain photograph-album for exhibiting pictures for which Letters Patent of the United States, No. 385,838, were granted to me on the 10th day of July, 1888.

The album referred to consists of a case pivotally mounted upon a support, whereby it is adjustable to desired angles with relation to the latter and provided with a hinged cover. The picture-frames or leaves of the album are provided on their back or inner edges with narrow strips bent to afford lateral beads upon the opposite sides of said edges, each pair of beads thus formed being cut away in alternate lengths to permit them to coincide and intermesh with the adjacent beads of contiguous leaves. Rods are provided in the tubes thus formed by the intermeshing beads to hinge the leaves together in endless series, the connections at their backs forming an endless chain to travel over sprocket-wheels toward the bottom and top, respectively, of the case. The upper sprocket-wheels are operated by means of a knob to rotate and turn the leaves of the album or exhibitor backward or forward, as desired. While the construction of hinge for the frames or leaves afforded by the lateral beads above described is, generally speaking, satisfactory and desirable, it will not permit a leaf to separate from the adjacent leaves beyond a quarter-revolution. This, as described in the patent aforesaid, renders it necessary to provide a special connection (viz., a beaded strip without a frame) between two of the leaves, whereby said leaves may separate the distance of a half-revolution and lie uppermost when it is desired to close the lid of the case. The necessity involved of turning the knob until the proper leaves come uppermost, when they do not happen of themselves to occupy such a position, to permit closing of the cover, renders improvement desirable; and it is my present object to provide a pivotal connection for the adjacent edges of contiguous leaves, which will enable the latter to separate the distance of a half-revolution, whereby the lid of the case may be closed whichever leaves of the connected series are uppermost.

To this end my invention consists in providing links between the leaves, pivotally connected, toward opposite ends, to adjacent edges of the latter; and it further consists in details of construction and combinations of parts.

In the drawings, Figure 1 is a perspective view of a photograph-album or picture-exhibitor provided with my improvements; Fig. 2, a broken vertical section taken on the line 2 of Fig. 3 and viewed in the direction of the arrow, showing the inner ends of the leaves or frames connected together in endless series by links; and Fig. 3, a broken section taken on the line 3 of Fig. 2 and viewed in the direction of the arrow.

A is a case, by preference pivotally mounted upon standards and rounded at the bottom, as shown, and provided with a hinged lid, A'.

B B are leaves or frames, preferably of sheet metal, having grooves to confine photographs or the like at their edges, and open at one end to permit the insertion or withdrawal, substantially as in ordinary photograph albums.

The leaves B are provided on their inner edges, $t$, with laterally-flanged strips $s$, also of sheet metal, of greater width than the leaves, and projecting equally on opposite sides of the latter, the lateral flanges of the strips $s$ affording sides $s'$. The opposite extremities, $s^2$, of the strips $s$ are bent toward each other and toward the extremities of the sides $s'$, spaces $s^3$ being caused to intervene between the extremities $s^2$ and ends of the sides $s'$, for a purpose hereinafter described. The extremities $s^2$ of the strips $s$ are perforated toward their lateral edges, to permit the insertion through them of wire rods $r$, which lie between the sides $s'$, longitudinally of the strips $s$, and project a short distance beyond the extremities $s^2$.

The leaves B are connected together by links $q$, having, preferably, circular ends and sides, as shown, and provided toward opposite ends with perforations which are the same distance apart as the perforations in the extremities $s^2$, before described. The links $q$ are in the spaces $s^2$ against the inner sides of the extremities $s^2$ of the strips $s$, and the rods $r$ pass through the perforations in the links $q$, as well as through the perforations in the extremities $s^2$, as before described, and thus serve to pivot the links at opposite ends to adjacent strips $s$ and connect the latter together. All the leaves B are fastened in this manner in endless series, as illustrated in Fig. 2.

The leaves are adjusted in operative position in the case A in a manner similar to that shown and described in my aforesaid patent, and briefly as follows: Plates $p$, having perforations $o\ o$ in corresponding places, fit into grooves $p'$ on the inner opposite sides of the case A, midway of its length. Two shafts, $o'$, carrying sprocket-wheels $n$ toward their opposite ends, have their bearings in the upper and correspondingly elevated lower holes, $o$, in the opposing plates $p$, the upper shaft, $o'$, extending through a slot, $o^2$, in the case to the exterior of the latter, where it is provided with a knob, $m$. The endless chains formed by the extremities $s^2$ of the flanged strips $s$ and their connecting-links $q$ are arranged to fit over the shafts $o'$, and the projecting ends of the rods $r$, which afford teeth $r'$, mesh with the sprocket-wheels $n$. The additional holes $o$ provided in the plates $p$ afford bearings for the lower shaft, $o'$, at different levels, whereby the number of leaves or frames in series may be increased or decreased within prescribed limits, as desired, the lengthening or shortening of the endless chains necessitating the adjustment of the lower shaft, $o'$, in bearings $o$ at the proper level.

By the employment of the link $q$, adjusted as described, the leaves B may be placed as near together as in the device shown in the patent above referred to, while they afford, at the same time, a double-jointed connection, which permits the leaves to separate the distance of a half-revolution, and thus permit the top leaves to be simultaneously in horizontal positions.

What I claim as new, and desire to secure by Letters Patent, is—

1. In a photograph album or picture-exhibitor, the combination, with a case, A, of leaves B, supported within the case and having rigid lateral projections $s^2$, links $q$, pivotally connecting the leaves together in endless series at their projections $s^2$ and affording double-jointed connections between each adjacent pair of the leaves, teeth $r'$, extending from the leaves, and rotary sprocket-wheels $n$, supported to mesh with the teeth $r'$, substantially as described.

2. In a photograph-album or picture-exhibitor, the combination, with the case A, of leaves B, supported within the case and having rigid lateral projections $s^2$, links $q$, pivotally connecting the leaves together in endless series at their projections $s^2$ and affording double-jointed connections between each adjacent pair of the leaves, rods $r$, having ends which afford teeth $r'$, extending beyond the ends of the leaves, and rotary sprocket-wheels $n$, supported to mesh with the teeth $r'$, substantially as described.

3. In a photograph-album or picture exhibitor, the combination, with a case, A, of leaves B, supported within the case, provided at their edges $t$ with strips $s$, having flanged extremities $s^2$, affording bearings for rods $r$, links $q$, pivotally connected with the adjacent rods, having bearings in the extremities of contiguous strips and affording double-jointed connections between each adjacent pair of leaves, teeth upon the leaves, and shafts $o'$, carrying sprocket-wheels $n$, to engage the teeth at opposite extremities of the endless series of leaves, and a suitable handle on one of the shafts $o'$ at which to turn the leaves, substantially as described.

4. In a photograph-album or picture-exhibitor, the combination, with a case, A, of leaves B, supported within the case, provided at their edges $t$ with strips $s$, having flanged extremities $s^2$, affording bearings for rods $r$, which project beyond said extremities to form teeth $r'$, links $q$, pivotally connecting adjacent rods, having bearings in the extremities of contiguous strips $s$ and affording double jointed connections between each adjacent pair of leaves, shafts $o'$, carrying sprocket-wheels $n$, to engage the teeth $r'$ at opposite extremities of the endless series of leaves, and a suitable handle on one of the shafts $o'$ at which to turn the leaves, substantially as described.

HYPPOLITE BOUSSEMAERE.

In presence of—
M. J. BOWERS,
J. W. DYRENFORTH.